US012467639B2

(12) United States Patent
Wu et al.

(10) Patent No.: US 12,467,639 B2
(45) Date of Patent: Nov. 11, 2025

(54) DEHUMIDIFIER APPLIANCE AND METHODS FOR DETECTING WATER LEVELS WITHIN A DEHUMIDIFIER APPLIANCE

(71) Applicant: Haier US Appliance Solutions, Inc., Wilmington, DE (US)

(72) Inventors: Jieqiang Wu, Zhuhai (CN); Jian Cui, Shanghai (CN); Xuexun Li, Shanghai (CN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/688,065

(22) PCT Filed: Aug. 10, 2023

(86) PCT No.: PCT/CN2023/112221
§ 371 (c)(1),
(2) Date: Feb. 29, 2024

(87) PCT Pub. No.: WO2025/030477
PCT Pub. Date: Feb. 13, 2025

(65) Prior Publication Data

US 2025/0244027 A1 Jul. 31, 2025

(51) Int. Cl.
*F24F 1/0358* (2019.01)
*F24F 11/88* (2018.01)
(Continued)

(52) U.S. Cl.
CPC ............ *F24F 1/0358* (2019.02); *F24F 11/88* (2018.01); *F24F 13/222* (2013.01); *G01F 23/26* (2013.01)

(58) Field of Classification Search
CPC ... F24F 1/0358; F24F 3/1405; F24F 13/20–24
See application file for complete search history.

(56) References Cited

U.S. PATENT DOCUMENTS 3,500,654 A * 3/1970 Sholtes .................. F24F 13/22
200/61.07
4,428,207 A 1/1984 Hall
(Continued)

FOREIGN PATENT DOCUMENTS

CN 101178216 A 5/2008
CN 202792391 U 3/2013
(Continued)

OTHER PUBLICATIONS

International Search Report and Written Opinion for Application No. PCT/CN2023/112221, dated Dec. 21, 2023, 9 pages.

*Primary Examiner* — Christopher R Zerphey
(74) *Attorney, Agent, or Firm* — Dority & Manning, P.A.

(57) ABSTRACT

A dehumidifier appliance including a cabinet defining an airflow path; a water tank removably mounted within the cabinet below the airflow path; a first connector provided within the cabinet, the first connector comprising a pair of receiving pins and a pair of first magnets; a second connector provided within the water tank and configured to mate with the first connector, the second connector comprising a pair of contact pins and a pair of second magnets; and a controller configured to perform an operation. The operation includes determining that a first circuit between the pair of first magnets and the pair of second magnets is closed; initiating a dehumidifying cycle; determining that a second circuit between the pair of receiving pins and the pair of contact pins is closed; and implementing a responsive action in response to determining that the second circuit is closed.

18 Claims, 15 Drawing Sheets

(51) Int. Cl.

| | |
|---|---|
| ***F24F 13/22*** | (2006.01) |
| ***G01F 23/26*** | (2022.01) |

(56) References Cited

U.S. PATENT DOCUMENTS

| | | | | |
|---|---|---|---|---|
| 10,082,302 | B2 * | 9/2018 | Yoon | F24F 1/0358 |
| 10,578,481 | B2 * | 3/2020 | Myeong | F24F 11/30 |
| 10,610,907 | B1 | 4/2020 | Scaringe et al. | |
| 10,928,081 | B2 * | 2/2021 | Cho | G01F 23/26 |
| 11,498,027 | B2 | 11/2022 | Yoon et al. | |
| 2015/0083557 | A1 | 3/2015 | Chiu | |
| 2016/0153824 | A1 | 6/2016 | Myeong et al. | |
| 2016/0334118 | A1 * | 11/2016 | Ahn | F24F 13/28 |
| 2017/0121950 | A1 | 5/2017 | Monk | |
| 2023/0213219 | A1 * | 7/2023 | Gong | F24F 3/1405 62/93 |
| 2025/0198639 | A1 * | 6/2025 | Park | F24F 11/30 |

FOREIGN PATENT DOCUMENTS

| | | | |
|---|---|---|---|
| CN | 203704178 | U | 7/2014 |
| CN | 105546764 | B | 10/2018 |
| CN | 211695192 | U | 10/2020 |
| JP | H11337112 | A | 12/1999 |
| JP | 2004264193 | A | 9/2004 |
| JP | 2006234286 | A | 9/2006 |
| JP | H07113464 | B2 | 12/2010 |

* cited by examiner

DEHUMIDIFIER APPLIANCE AND METHODS FOR DETECTING WATER LEVELS WITHIN A DEHUMIDIFIER APPLIANCE

CROSS-REFERENCE TO RELATED APPLICATIONS

The present application is the National Stage Entry of and claims the benefit of priority under 35 U.S.C. § 371 to PCT Application Serial No. PCT/CN2023/112221 filed Aug. 10, 2023, and entitled DEHUMIDIFIER APPLIANCE AND METHODS FOR DETECTING WATER LEVELS WITHIN A DEHUMIDIFIER APPLIANCE which is hereby incorporated by reference in its entirety.

FIELD OF THE INVENTION

The present subject matter relates generally to dehumidifier appliances, and more particularly to monitoring water levels within dehumidifier appliances.

BACKGROUND OF THE INVENTION

Dehumidifying appliances or dehumidifiers and other air treatment devices, such as air cleaners, and personal coolers (i.e., swamp coolers), are a common for use in the home and office. Typical dehumidifiers often include a refrigeration system having compressor, along with a collection bucket to gather water condensation that gathers at the refrigeration system. An air flow system, such as a fan and one or more ducts, draws in ambient air that dehumidified and expelled from the dehumidifier. Generally, water extracted from the air is collected in a collection bucket that is periodically emptied or replaced as water condensation fills the collection bucket.

In some instances, the dehumidifier appliance runs constantly to remove a maximum amount of moisture from the air. Generally, one or more stop measures are provided within the appliances to determine when the collection bucket is full of collected water condensate. For instance, conventional dehumidifier appliances incorporate a floater switch provided within the collection bucket. When water reaches a predetermined height, the floater rises to trigger a switch to cease the operation of the appliance. However, these conventional approaches have certain drawbacks. For instance, mechanical detection measures may be susceptible to failure over repeated cycles. Additionally or alternatively, false readings may occur, ceasing the dehumidifying operation prematurely.

Accordingly, a dehumidifier appliance that obviates one or more of the above-mentioned drawbacks would be desirable. In particular, a dehumidifier appliance with improved methods for detection of a water level within a collection bucket would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a dehumidifier appliance is provided. The dehumidifier appliance may include a cabinet defining an airflow path that extends between an air inlet and an air outlet spaced apart from the air inlet; a water tank removably mounted within the cabinet below the airflow path; a first connector provided within the cabinet, the first connector including a pair of receiving pins and a pair of first magnets; a second connector provided within the water tank and configured to mate with the first connector, the second connector including a pair of contact pins and a pair of second magnets; and a controller in operative communication with the first connector, the controller configured to perform an operation. The operation may include determining that a first circuit between the pair of first magnets and the pair of second magnets is closed; initiating a dehumidifying cycle; determining that a second circuit between the pair of receiving pins and the pair of contact pins is closed; and implementing a responsive action in response to determining that the second circuit is closed.

In another exemplary aspect of the present disclosure, a method of operating a dehumidifier appliance is provided. The dehumidifier appliance may include a first connector including a pair of first magnets and a pair of receiving pins and a second connector including a pair of second magnets and a pair of contact pins. The method may include determining that a first circuit between the pair of first magnets and the pair of second magnets is closed; initiating a dehumidifying cycle; determining that a second circuit between the pair of receiving pins and the pair of contact pins is closed; and implementing a responsive action in response to determining that the second circuit is closed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
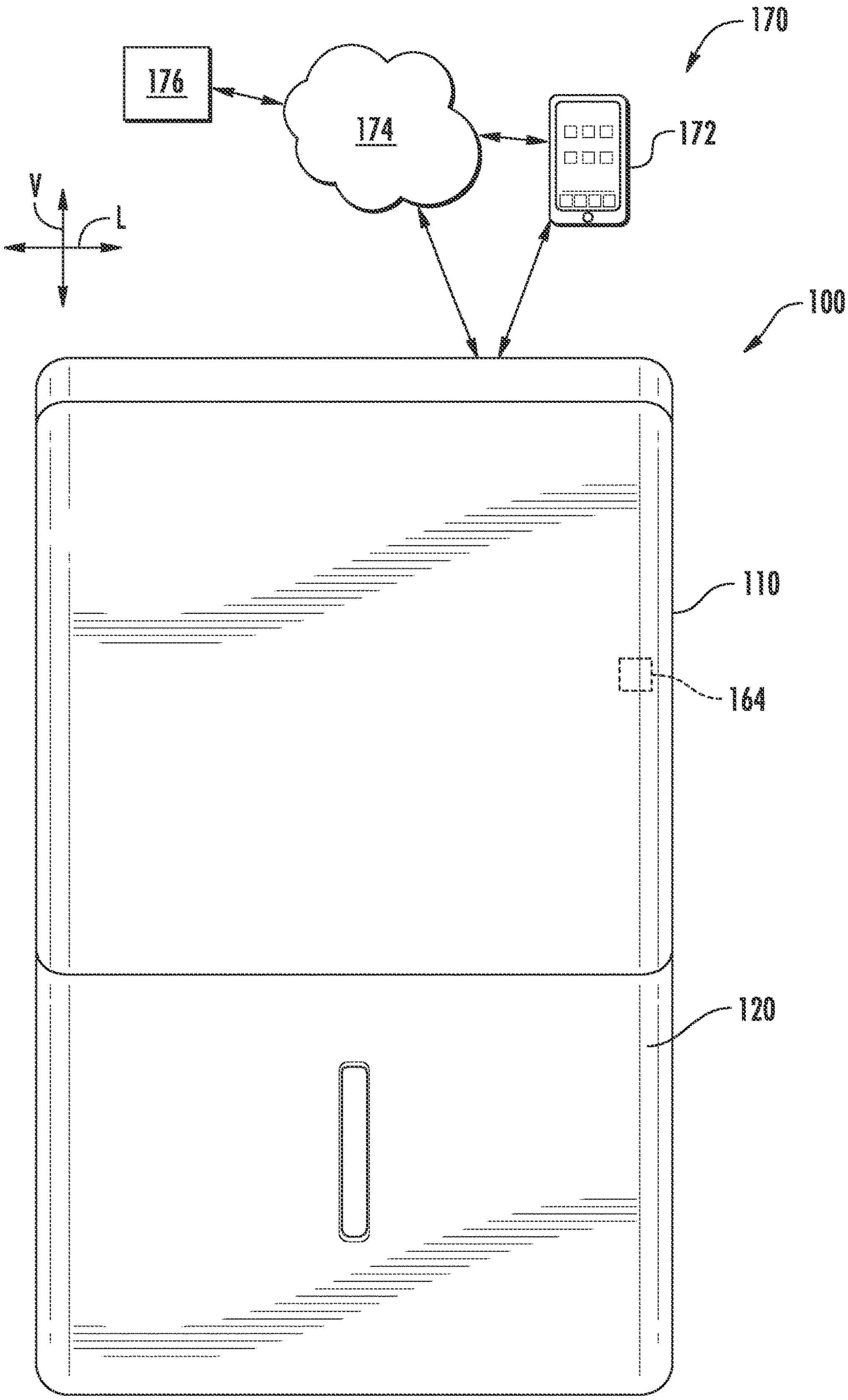
FIG. 1 provides a front elevation view of a dehumidifier appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
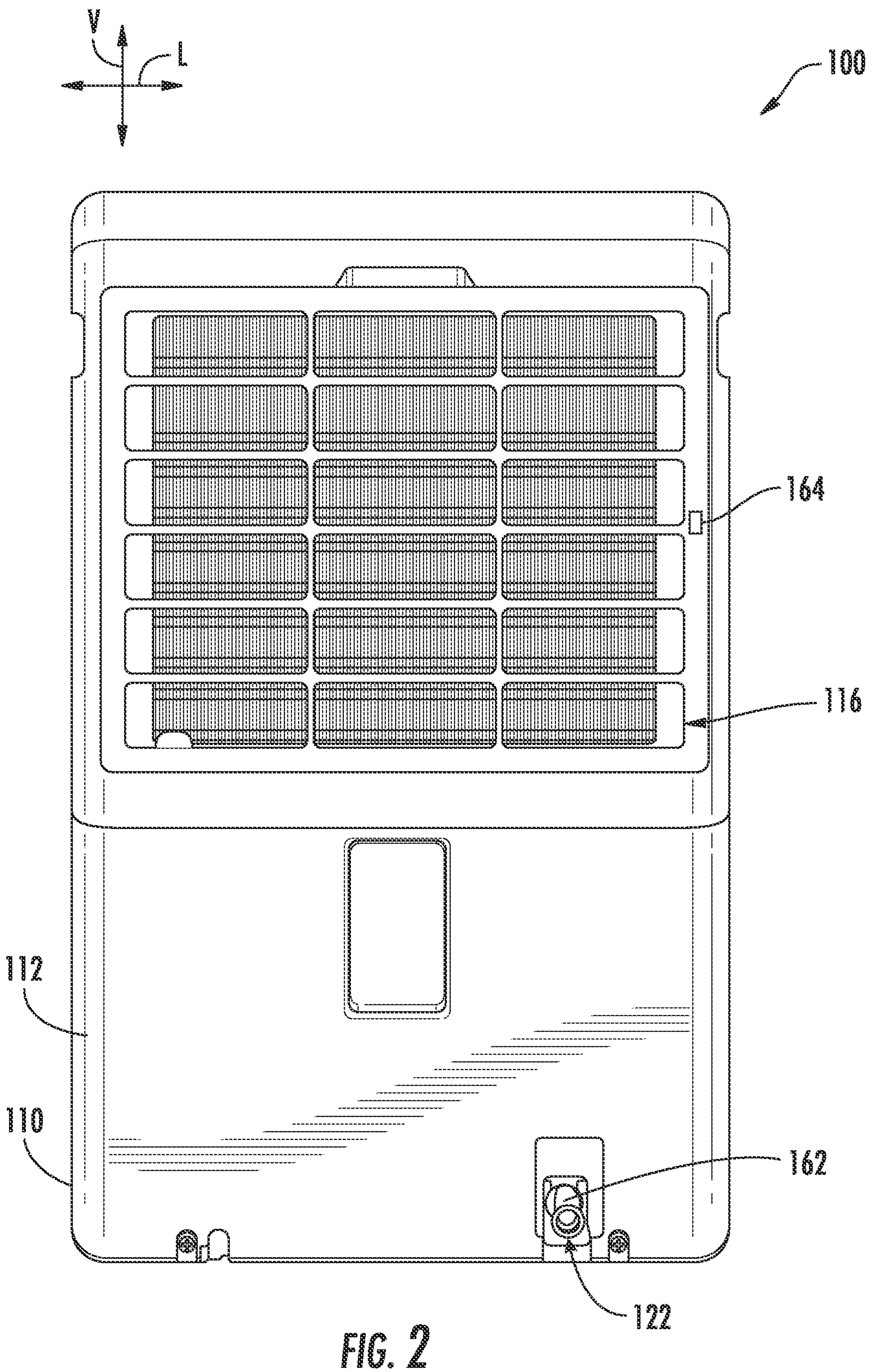
FIG. 2 provides a rear elevation view of the exemplary dehumidifier appliance of FIG. 1.
Figure 3:
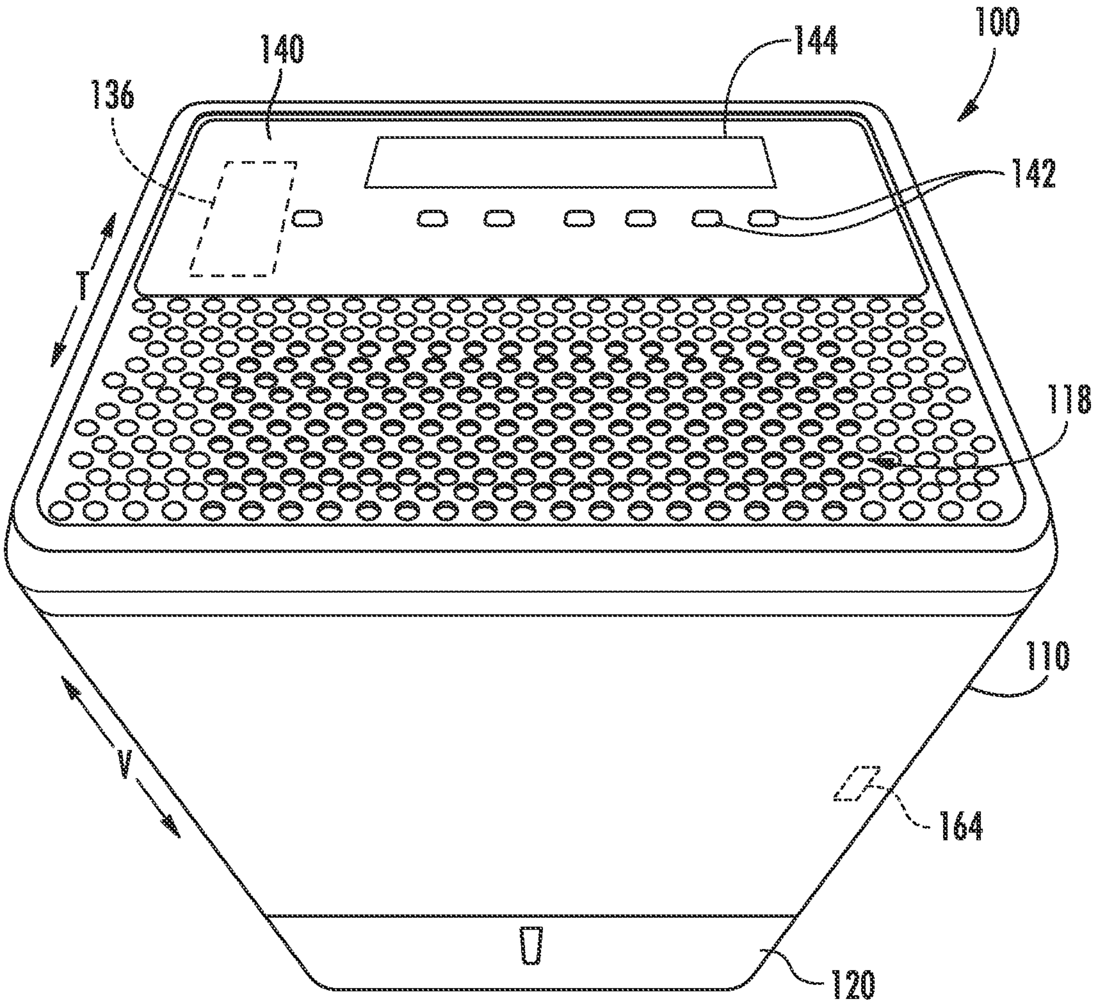
FIG. 3 provides a top perspective view of the exemplary dehumidifier appliance of FIG. 1.
Figure 4:
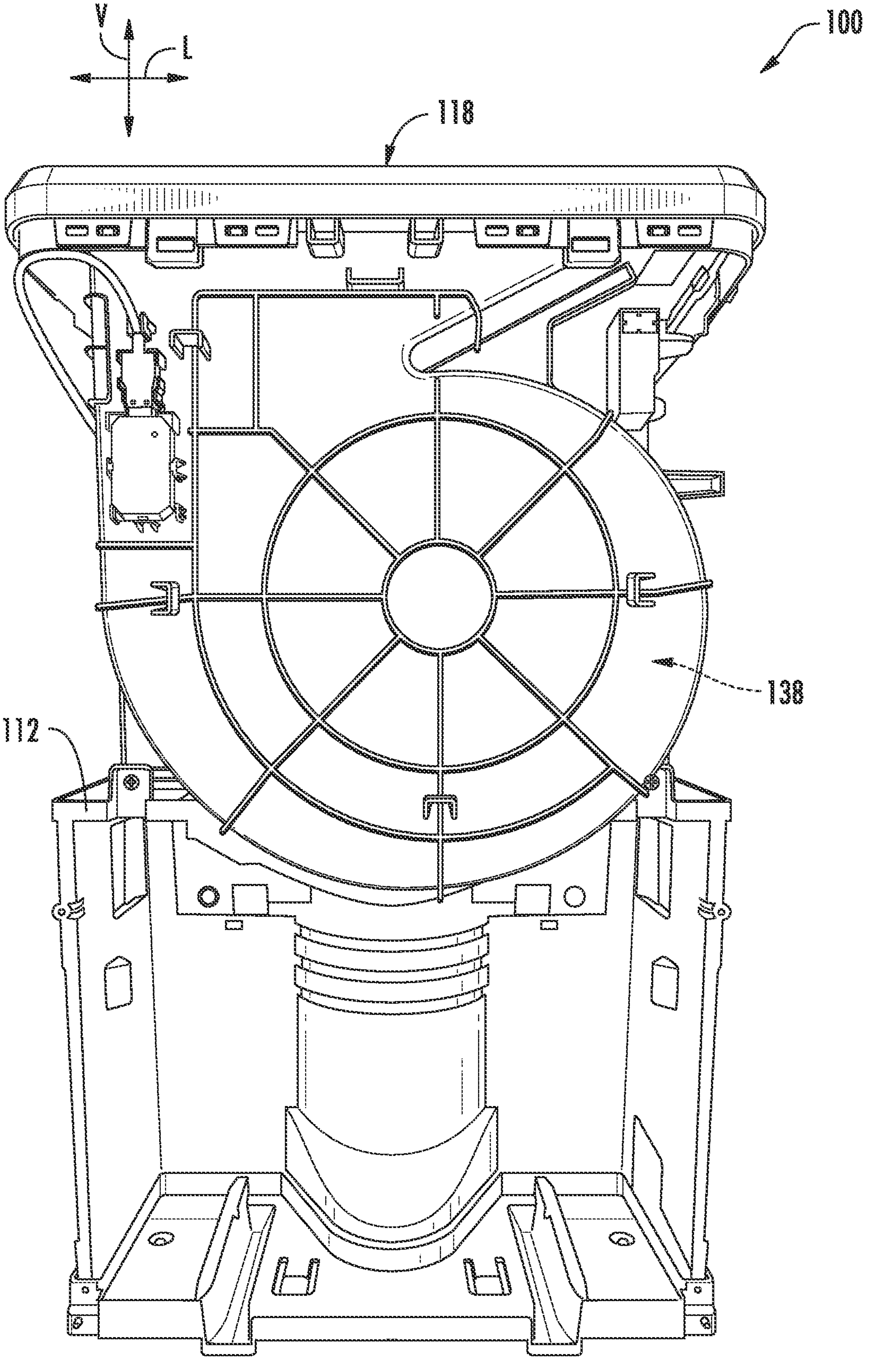
FIG. 4 provides a front perspective view of the exemplary dehumidifier appliance of FIG. 1, wherein an outer panel and water bucket have been removed for clarity.
Figure 5:
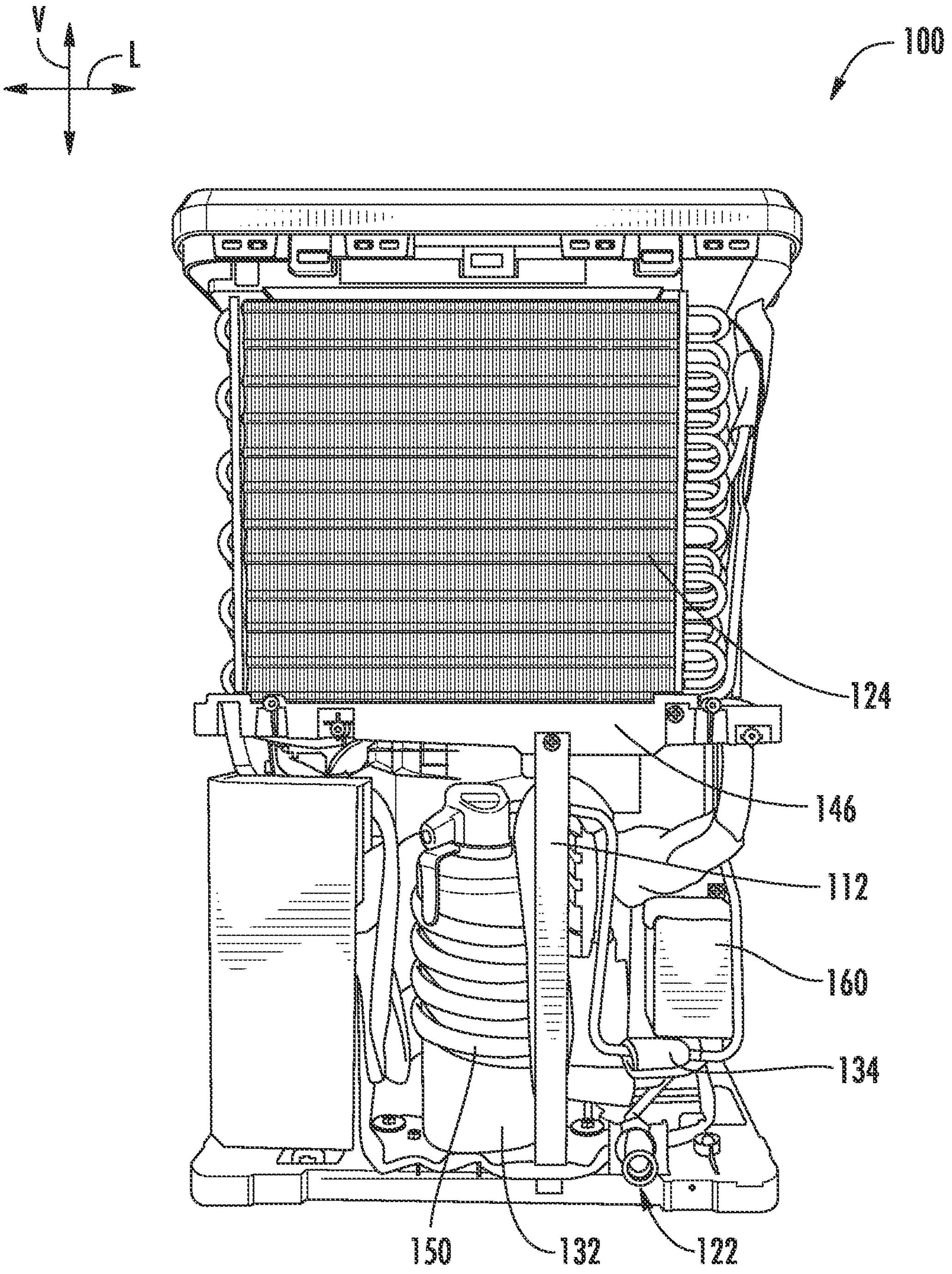
FIG. 5 provides a rear perspective view of the exemplary dehumidifier appliance of FIG. 1, wherein an outer panel has been removed for clarity.
Figure 6:
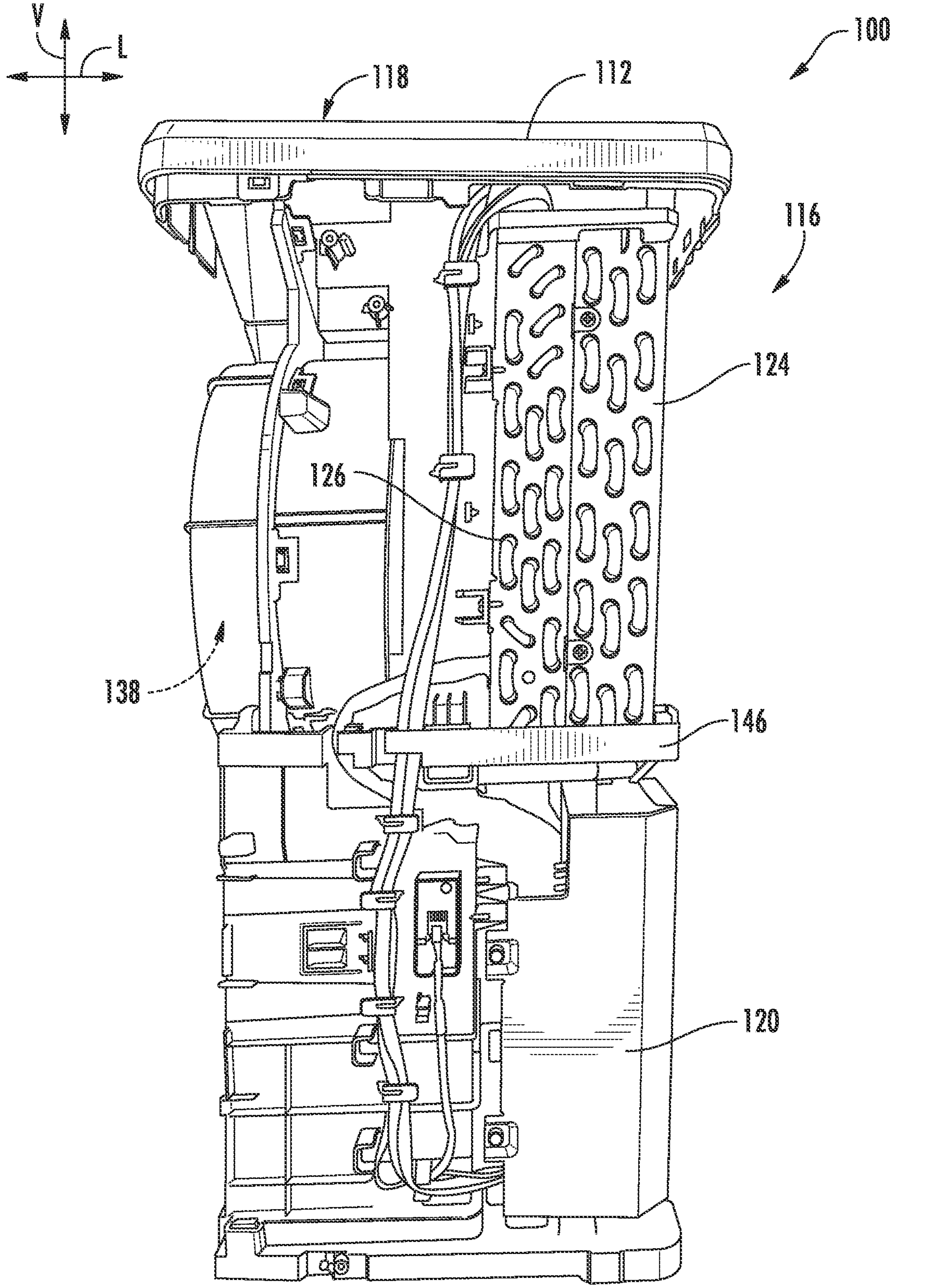
FIG. 6 provides a side perspective view of the exemplary dehumidifier appliance of FIG. 1, wherein an outer panel has been removed for clarity.
Figure 7:
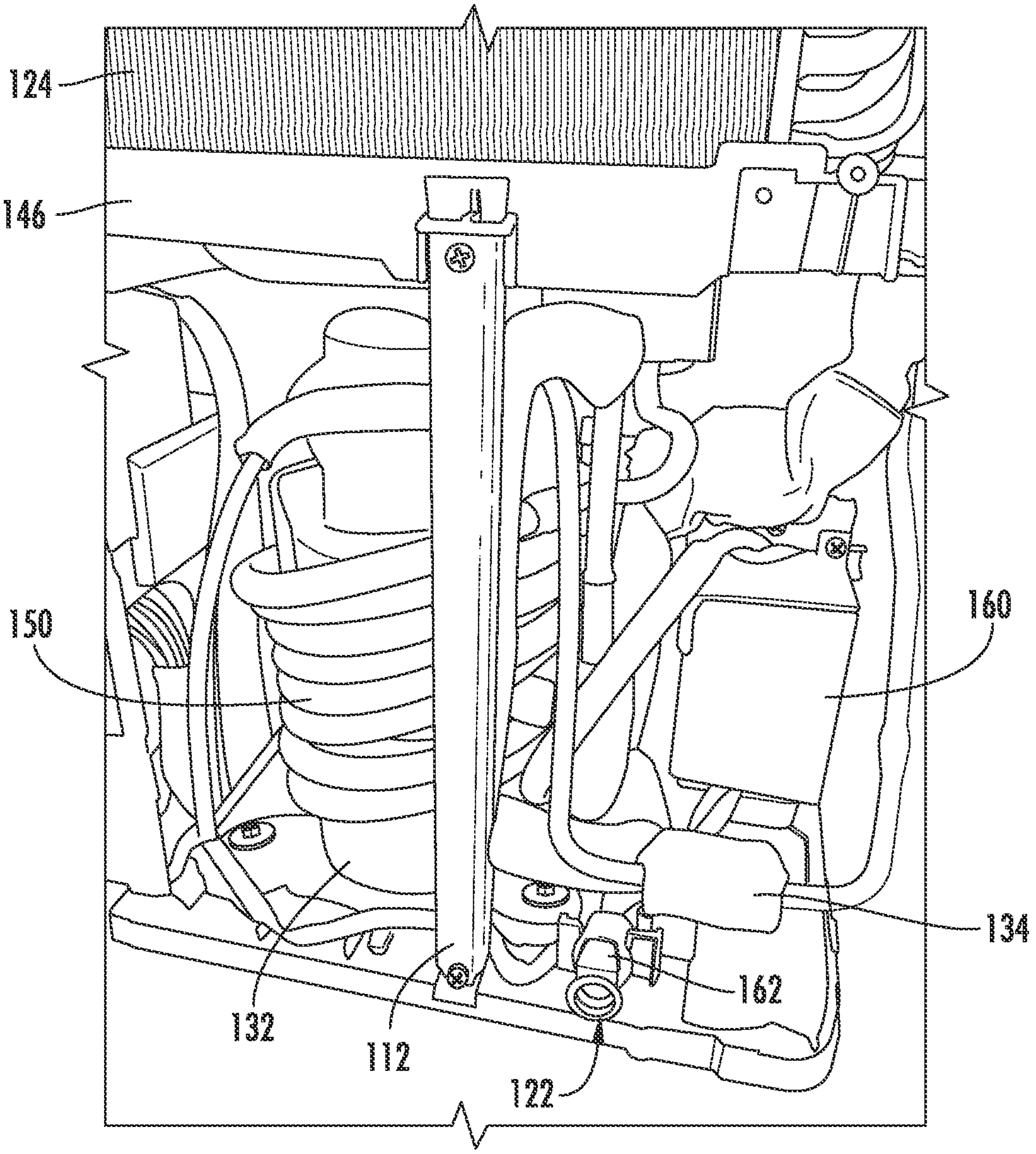
FIG. 7 provides a magnified perspective view of a portion of the exemplary dehumidifier appliance of FIG. 1.

Turning now to the figures, FIGS. 1 through 3 provide various views of an assembled dehumidifier appliance 100 according to exemplary embodiments of the present disclosure. Generally, dehumidifier appliance 100 includes a cabinet 110 that defines a vertical direction V, a lateral direction L, and a transverse direction T. Each direction V, L, T is perpendicular to the other directions, such that an orthogonal coordinate system is generally defined. As would be understood, cabinet 110 may include a frame 112 and one or more outer panels covering various portions of frame 112. As will be described in greater detail below, various components of dehumidifier appliance 100 may be housed therein. In particular, one more portions of a refrigeration assembly (e.g., refrigeration loop 130) are mounted within cabinet 110.

Along with housing various components, cabinet 110 defines an airflow passage between an air inlet 116 and an air outlet 118 spaced apart from the air inlet 116. In some embodiments, cabinet 110 defines air inlet 116 at a front grill that extends over a front face of cabinet 110. In additional or alternative embodiments, cabinet 110 defines air outlet 118 at a top grill (e.g., positioned at a top end of cabinet 110 or otherwise above air inlet 116). Thus, relative to the direction of airflow through cabinet 110, air outlet 118 may be defined downstream from air inlet 116 and thereabove. During use, ambient air may flow into air inlet 116 and through cabinet 110 (e.g., via natural convection or forced airflow motivated by an internal fan). Within cabinet 110, water vapor or moisture may be removed from the air (i.e., the air within cabinet 110 may be dehumidified). From the cabinet 110, such dehumidified air may be expelled (e.g., upward) through air outlet 118 and returned to the ambient environment.

In some embodiments, a water tank 120 defining a reservoir is mounted (e.g., removably mounted) to cabinet 110 to receive at least a portion of the water condensation. For instance, water tank 120 may be slidably mounted to cabinet 110 below an evaporator 124. Nonetheless, as would be understood—and except as otherwise indicated—dehumidifier appliance 100 may be provided without or adapted to function without a tank for collecting water and, instead, direct water condensation directly outside of cabinet 110 (e.g., through an outlet port 122) to the ambient environment or a separate drain line.

Figure 8:
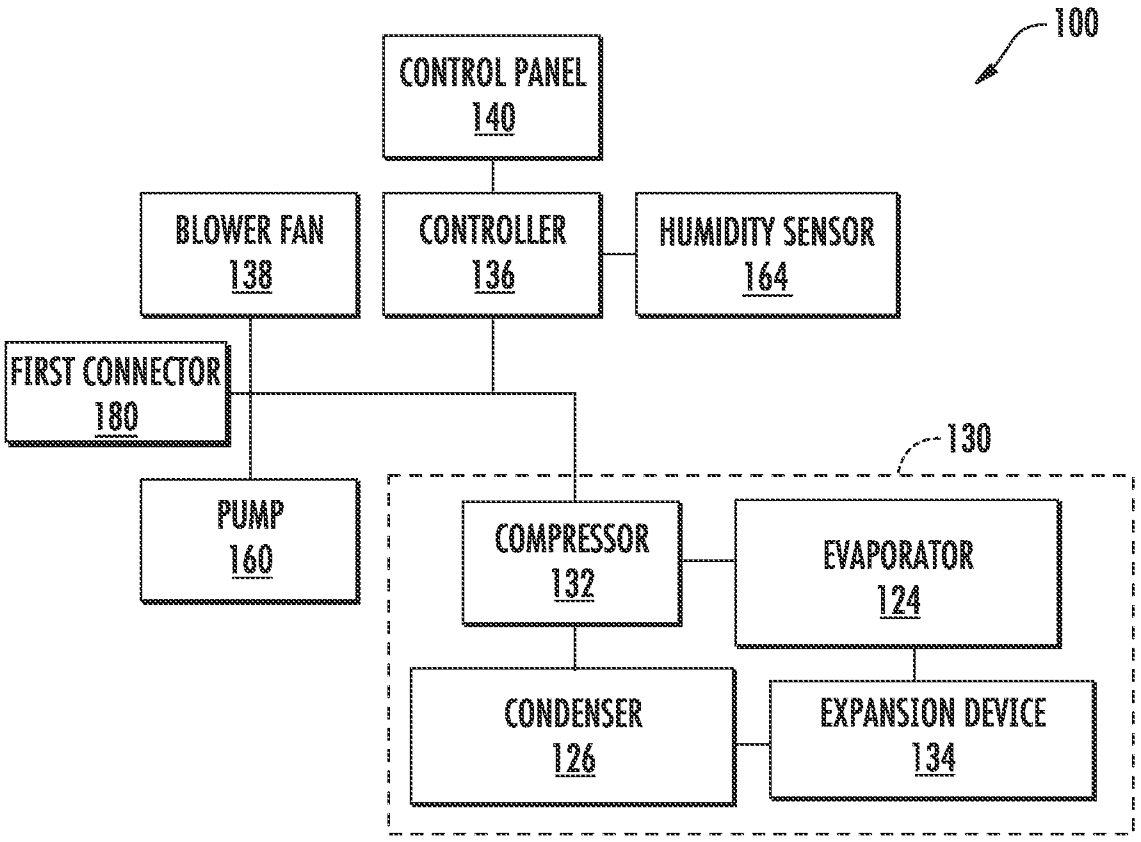
FIG. 8 provides a schematic view of the exemplary dehumidifier appliance of FIG. 1.

Referring now also to FIGS. 4 through 8, FIGS. 4 through 7 provide various views of dehumidifier appliance 100 wherein various portions (e.g., outer casing or water tank 120) have been removed for clarity. FIG. 8 provides a schematic view of dehumidifier appliance 100 illustrating operable connections between various features. It should be appreciated that the construction of dehumidifier appliance 100 and the configuration of its various components may vary without departing from the scope of the present subject matter.

As shown, a refrigeration loop 130 having a discrete evaporator 124 and condenser 126 may be included with dehumidifier appliance 100. Specifically, evaporator 124 may be disposed along the airflow path within cabinet 110. Relative to the flow of air, evaporator 124 may thus be mounted downstream from air inlet 116. In some embodiments, condenser 126 is further disposed along the airflow path within cabinet 110. For instance, relative to the flow of air, condenser 126 may be mounted between evaporator 124 and air outlet 118 (i.e., downstream from evaporator 124 and upstream from air outlet 118).

Refrigeration loop 130 may further include compressor 132 and an expansion device 134 mounted within cabinet 110 (e.g., below evaporator 124 or otherwise apart therefrom). As illustrated, compressor 132 and expansion device 134 may be in fluid communication with condenser 126 and evaporator 124 to flow refrigerant therethrough, as is generally understood. More particularly, refrigeration loop 130 may include various lines for flowing refrigerant between the various components of refrigeration loop 130, thus providing the fluid communication there between. Refrigerant may thus flow through such lines from evaporator 124 to compressor 132, from compressor 132 to condenser 126, from condenser 126 to expansion device 134, and from expansion device 134 to evaporator 124. The refrigerant may generally undergo phase changes associated with a refrigeration cycle as it flows to and through these various components, as is generally understood. One suitable refrigerant for use in refrigeration loop 130 is 1,1,1,2-Tetrafluoroethane, also known as R-134A, although it should be understood that the present disclosure is not limited to such example and rather that any suitable refrigerant may be used.

In some embodiments, compressor 132 is a variable speed compressor 132. In this regard, compressor 132 may be operated at various speeds depending on the dehumidification needs of the room (i.e., the room in which the appliance 100 is disposed) and the demand from refrigeration loop 130. For example, compressor 132 may be configured to operate at any speed between a minimum speed to a maximum rated speed. In some embodiments, use of variable speed compressor 132 enables efficient operation of refrigeration loop 130 (and thus dehumidifier appliance 100), minimizes unnecessary noise when compressor 132 does not need to operate at full speed, and ensures a comfortable environment within the corresponding room. During a dehumidification routine, moisture within the air may thus be condensed at the evaporator 124 without excessively reducing the temperature thereof.

As shown, expansion device 134 may be disposed within the cabinet 110 in fluid communication between the evaporator 124 and the condenser 126 relative to the flow of refrigerant. In some embodiments, expansion device 134 is an electronic expansion valve that generally enables controlled expansion of refrigerant. More specifically, electronic expansion device 134 may be configured to precisely control the expansion of the refrigerant to maintain, for example, a desired temperature differential of the refrigerant across the evaporator 124. In other words, electronic expansion device 134 selectively throttles the flow of refrigerant based on the reaction of the temperature differential across evaporator 124 or the amount of superheat temperature differential, thereby ensuring that the refrigerant is in the gaseous state entering compressor 132. In alternative embodiments, expansion device 134 may be a capillary tube or another suitable expansion device configured for use in a thermodynamic cycle.

In optional embodiments, a blower fan 138 may be mounted within cabinet 110 and directed at evaporator 124 to encourage or motivate the flow of air across evaporator 124. For instance, blower fan 138 may be positioned downstream of evaporator 124 relative to the airflow path through cabinet 110, as shown, to pull air through evaporator 124. Alternatively, though, blower fan 138 may be positioned upstream of evaporator 124 along the airflow path, and may operate to push air through evaporator 124.

The operation of dehumidifier appliance 100, including compressor 132, blower fan 138, expansion device 134, or other components of refrigeration loop 130 may be controlled by a processing device, such as a controller 136. Controller 136 may be operably coupled (via for example a suitable wired or wireless connection) to such components of the dehumidifier appliance 100. By way of example, the controller 136 may include a memory (e.g., non-transitive storage media) and one or more processing devices such as microprocessors, CPUs or the like, such as general or special purpose microprocessors operable to execute programming instructions or micro-control code associated with operation of dehumidifier appliance 100. The memory may represent random access memory such as DRAM, or read only memory such as ROM or FLASH. In one embodiment, the processor executes programming instructions stored in memory. The memory may be a separate component from the processor or may be included onboard within the processor.

In some embodiments, dehumidifier appliance 100 includes a control panel 140 and one or more user inputs 142, which may be included in control panel 140. The user inputs 142 may be operably coupled to the controller 136. A user of the dehumidifier appliance 100 may interact with the user inputs 142 to operate the dehumidifier appliance 100, and user commands may be transmitted (e.g., as command signals) between the user inputs 142 and controller 136 to facilitate operation of the dehumidifier appliance 100 based on such user commands. In particular, a unit may select a humidity input or relative amount of dehumidification at control panel 140. A display 144 may additionally be provided in the control panel 140, and may be operably coupled to the controller 136. Display 144 may, for example be a touchscreen or other text-readable display 144 screen, or alternatively may simply be a light that can be activated and deactivated as required to provide an indication of, for example, an event or setting for the dehumidifier appliance 100.

As noted above, water condensation collects on or at evaporator 124 during use. As shown, a collection tray 146 is disposed below the evaporator 124 to receive at least a portion of such water. An elevated rim may extend above a bottom wall such that water can gather within collection tray 146. Collection tray 146 is thus generally open along the vertical direction V to receive water as it falls. A tray outlet (not pictured) may be defined through the bottom wall and thus permit water to flow therefrom (e.g., to a separate line or portion of cabinet 110).

In some embodiments, an extended water conduit 150 is disposed within the cabinet 110 downstream from collection tray 146. As an example, extended water conduit 150 may be coiled (e.g., as a helix) within cabinet 110 such that multiple passes (e.g., three or more segments that each wrap 360° and) extend about a central void. Thus, water may flow from collection tray 146 and about the central void as it flows downward and downstream.

In optional embodiments, a water pump 160 is disposed in fluid communication with extended water conduit 150. Specifically, water pump 160 may be mounted within cabinet 110 downstream from collection tray 146 to motivate water through extended water conduit 150. In some embodiments, water pump 160 may be disposed downstream from extended water conduit 150 or water tank 120. Moreover, water pump 160 may be disposed upstream from an outlet port 122 through cabinet 110. Outlet port 122 may be defined through cabinet 110 (e.g., at a selectively actuated valve 162 or outlet line, generally) and directed outside of cabinet 110 (e.g., to the ambient environment or a connected extension line). Thus, water pump 160 may be selectively activated (e.g., by controller 136 in operable communication with water pump 160) to motivate water from water tank 120, or appliance 100 generally.

According to exemplary embodiments, dehumidifier appliance 100 may include one or more humidity sensors 164 which are in operative communication within controller 136. In this manner, humidity sensor 164 may measure room humidity and provide a corresponding signal to controller 136 to facilitate closed loop operation of dehumidifier appliance 100. As used herein, the terms "humidity sensor" or the equivalent may be intended to refer to any suitable type of humidity measuring system or device positioned at any suitable location for measuring the desired humidity. Thus, for example, "humidity sensor" may refer to any suitable type of humidity sensor, such as capacitive digital sensors, resistive sensors, and thermal conductivity humidity sensors. In addition, humidity sensor 164 may be positioned at any suitable location and may output a signal, such as a voltage, to a controller that is proportional to and/or indicative of the humidity being measured. Although exemplary positioning of humidity sensors is described herein, it should be appreciated that dehumidifier appliance 100 may include any other suitable number, type, and position of humidity sensors according to alternative embodiments.

Referring again to FIG. 1, a schematic diagram of an external communication system 170 will be described according to an exemplary embodiment of the present subject matter. In general, external communication system 170 is configured for permitting interaction, data transfer, and other communications between dehumidifier appliance 100 and one or more external devices. For example, this communication may be used to provide and receive operating parameters, user instructions or notifications, performance characteristics, user preferences, or any other suitable information for improved performance of dehumidifier appliance 100. In addition, it should be appreciated that external communication system 170 may be used to transfer data or other information to improve performance of one or more external devices or appliances and/or improve user interaction with such devices.

For example, external communication system 170 permits controller 136 of dehumidifier appliance 100 to communicate with a separate device external to dehumidifier appliance 100, referred to generally herein as an external device 172. As described in more detail below, these communications may be facilitated using a wired or wireless connection, such as via a network 174. In general, external device 172 may be any suitable device separate from dehumidifier appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with dehumidifier appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control dehumidifier appliance 100, etc. In addition, external device 172 and remote server 176 may communicate with dehumidifier appliance 100 to communicate similar information.

In general, communication between dehumidifier appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with dehumidifier appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 9:
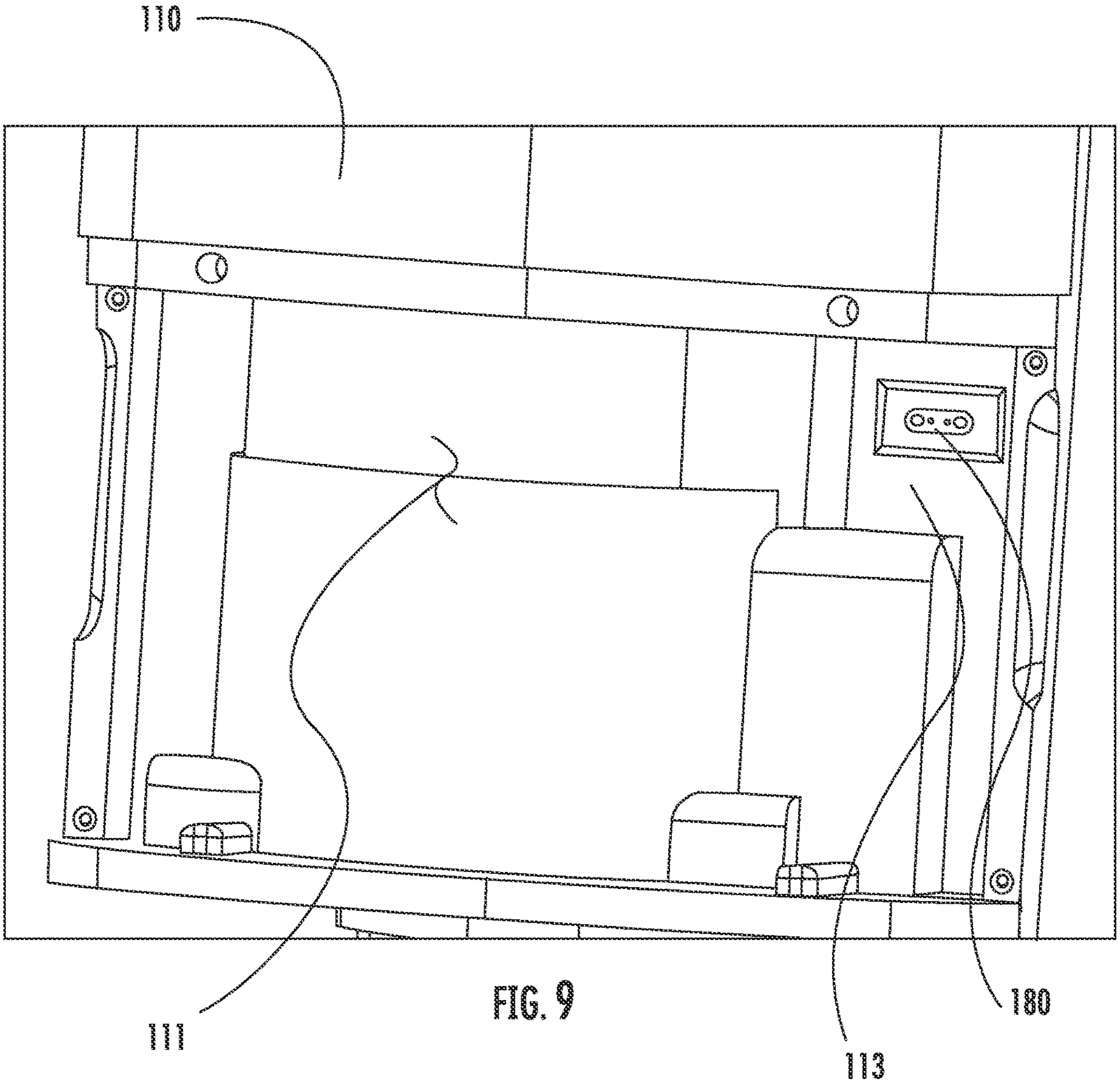
FIG. 9 provides a perspective view of an interior of the exemplary dehumidifier appliance of FIG. 1 with the water tank removed.

Referring now to FIG. 9, cabinet 110 is shown with water tank 120 removed. In particular, a first connector 180 is shown positioned within a receiving space 111 of cabinet 110. For instance, first connector 180 may be positioned at a rear of receiving space 111. According to at least some embodiments, first connector 180 is attached to a rear wall (or mid plate) 113 of cabinet 110. Accordingly, at least a portion of first connector 180 is provided within receiving space 111 while an attachment means (e.g., a fastener, described below) is positioned outside of receiving space 111 (e.g., at a rear face of cabinet 110). As shown, first connector 180 may be positioned at an upper portion of receiving space 111. Additionally or alternatively, first connector 180 may be positioned at a lateral side of receiving space 111. As will be described below, first connector 180 may selectively mate with a second connector.

Figure 10A:
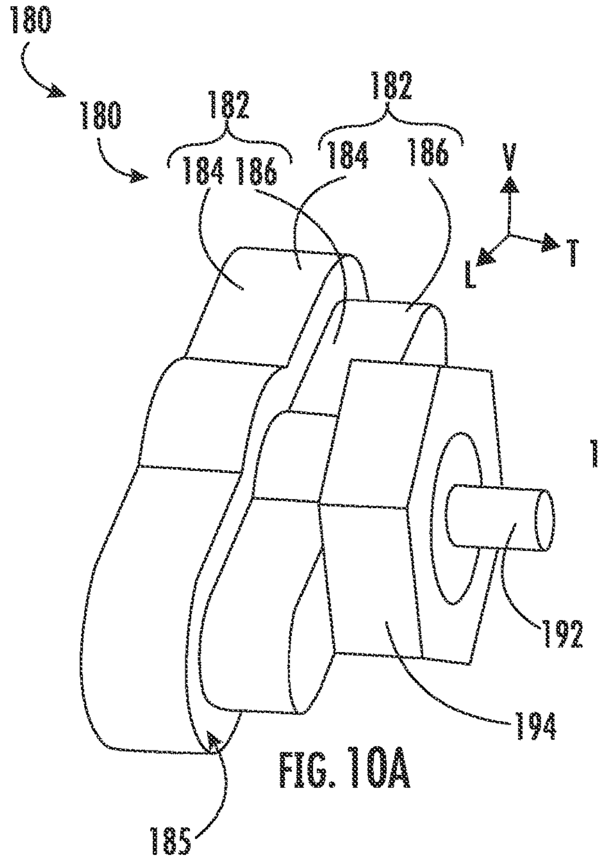
FIGS. 10A, 10B, and 10C provide perspective views of a first connector of the exemplary dehumidifier appliance of FIG. 1.
Figure 10B:
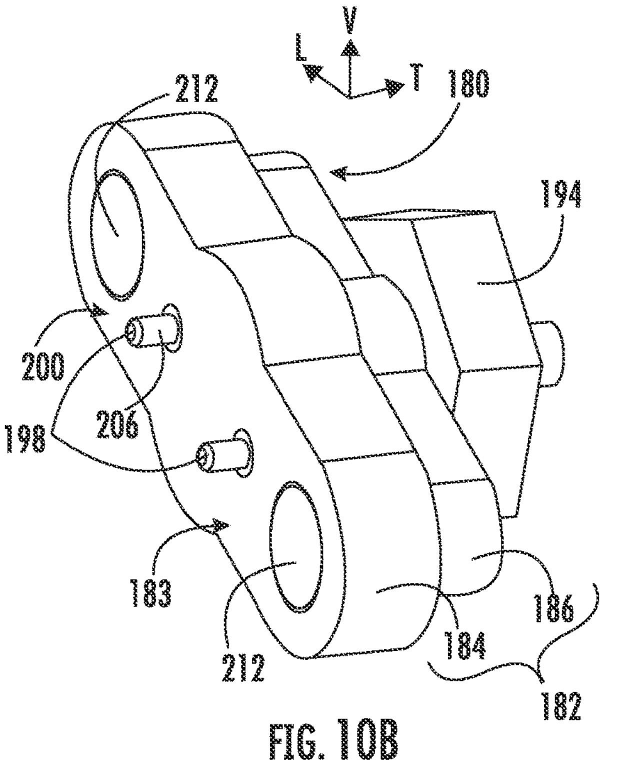
Figure 10C:
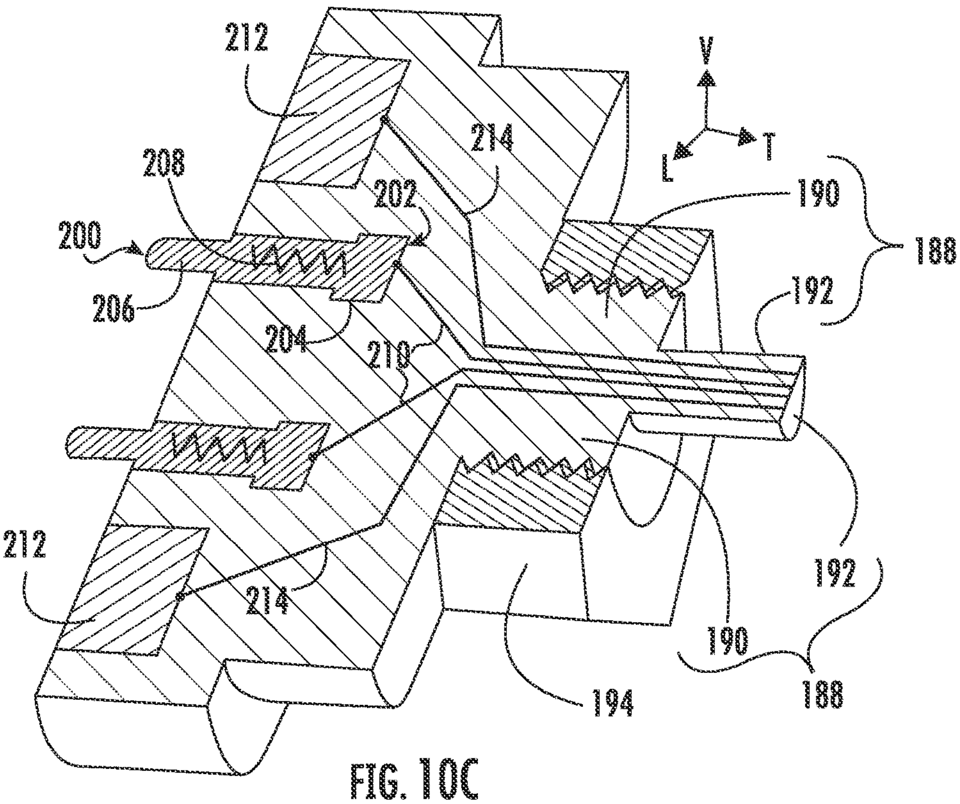

Referring now to FIGS. 10A, 10B, and 10C, first connector 180 is shown in multiple perspective views as well as a cross-section along the lateral direction L and transverse direction T. First connector 180 may include a body 182. As shown, body 182 may be predominantly elongated along the lateral direction L. Further, body 182 may define a depth D along the transverse direction T. Body 182 may include a first portion 184 and a second portion 186. First portion 184 may be larger than second portion 186 (e.g., along the lateral direction L and the vertical direction V). For instance, first portion 184 may define a stepped surface 185 facing rearward along the transverse direction T, provided around second portion 186. As will be described below, stepped surface 185 may contact an inner face of rear wall 113 when first connector 180 is installed. Body 182 may be formed from a non-conducting material. For instance, body 182 may be a plastic, a poly compound, or the like. As such, body 182 may electrically isolate certain items (described below).

Body 182 may include a pin 188. Pin 188 may extend or protrude from a rear face of second portion 186 rearward along the transverse direction T. Pin 188 may include a threaded portion 190 and an extension portion 192 extending therefrom along the transverse direction T. For instance, threaded portion 190 may have a male thread formed along an outer cylindrical wall thereof. Extension portion 192 may thus be predominantly smooth. Additionally or alternatively, a diameter of threaded portion 190 may be greater than a diameter of extension portion 192. Although threaded portion 190 is described herein as having a male thread (e.g., a screw), other embodiments may be incorporated, and the disclosure is not limited to the examples given herein. Referring briefly back to FIG. 8, first connector 180 (e.g., via extension portion 192) may be electrically connected with controller 136 (e.g., via one or more lines, busses, wires, or the like). Thus, extension portion 192 may be provided within cabinet 110.

A fastener 194 may be selectively attached to pin 188. For instance, fastener 194 may include a female thread complementary to threaded portion 190. Fastener 194 may thus be a nut which selectively screws onto threaded portion 190. As mentioned above, in some embodiments, pin 188 does not include threaded portion 190. According to such embodiments, fastener 194 may be or include a clip, a plug, an adhesive, or another such fastener which my grip and hold pin 188 in place (e.g., with respect to rear wall 113). Thus, fastener 194 may be positioned on an outer face of rear wall (or mid plate) 113 such that pin 188 penetrates through rear wall 113. Fastener 194 may be tightened to pin 188 through rear wall 113. For instance, a thickness of second portion 186 along the transverse direction T may be greater than a thickness of rear wall 113. When fastener 194 is tightened to pin 188, a small gap (e.g., between about 1 millimeter (mm) and about 5 mm) may be formed between rear wall 113 and fastener 194. Accordingly, first connector 180 may be adjusted or moved with respect to rear wall 113 (e.g., along the transverse direction T) to a small degree.

Figure 11:
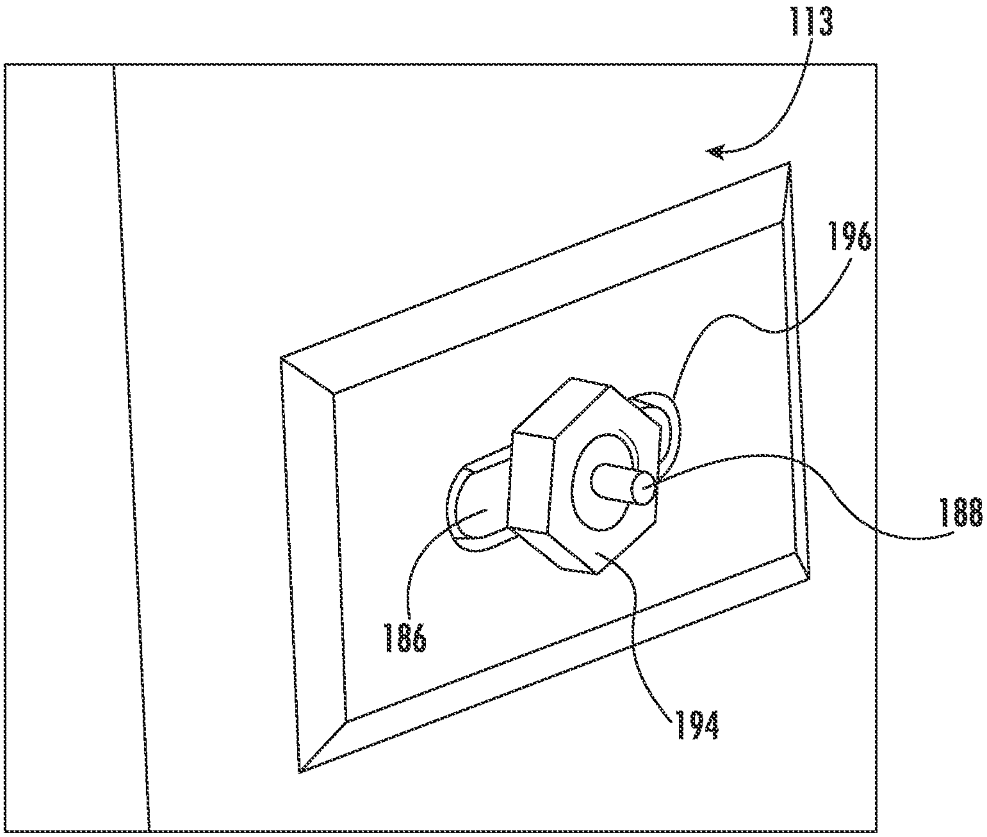
FIG. 11 provides a rear perspective view of the exemplary first connector of FIG. 10A in an installed position.

Referring briefly to FIG. 11, for instance, the rear face of rear wall 113 is shown with pin 188 penetrating therethrough and fastener 194 attached to pin 188. As shown, rear wall 113 may have an aperture 196 defined therethrough along the transverse direction T. Aperture 196 may be elongated along the lateral direction L. Thus, aperture 196 may be referred to as a slot allowing a movement of first connector 180. According to some embodiments, second portion 186 of body 182 of first connector 180 is positioned within aperture 196. A tolerance may be provided between aperture 196 and second portion 186. For instance, a gap of between about 1 millimeter (mm) and about 5 mm may be formed between second portion 186 and aperture 196. Accordingly, first connector 180 may be maneuvered within aperture 196. Fastener 194 may be tightened to allow for first connector to remain in position within aperture 196 while allowing for slight adjustment.

First connector 180 may include a pair of receiving pins 198. For instance, two receiving pins 198 may be provided within body 182. The pair of receiving pins 198 may be spaced apart from each other along the lateral direction L. Additionally or alternatively, each of the pair of receiving pins 198 may protrude from a front face of the first portion 184 of body 182 (e.g., along the transverse direction T). Each of the pair of receiving pins 198 may be identical. As such, hereinafter, a single receiving pin 198 will be described in detail with the understanding that the description applies to each receiving pin 198.

Receiving pin 198 may be a conductive member capable of producing an electric current. For instance, receiving pin 198 may provide a connection along an electrical circuit (e.g., between a source and a ground). Receiving pin 198 may thus be formed from a conductive material. For one example, receiving pin 198 is formed from copper. Receiving pin 198 may be formed from any conductive material, however, and the disclosure is not limited to the examples given herein.

Receiving pin 198 may include a contact end 200 and a blind end 202. Blind end 202 may be located within body 182. For instance, as seen in FIG. 10, blind end 202 may be positioned at or near a junction of first portion 184 and second portion 186 of body 182 (e.g., along the transverse direction T). Thus, blind end 202 may abut or be biased against second portion 186 of body 182 (e.g., forward along the transverse direction T). Accordingly, contact end 200 may be exposed from a front face 183 of body 182 (e.g., from first portion 184) toward water tank 120. As will be explained, contact end 200 may selectively interact with a second connector.

Receiving pin 198 may include a base 204, and a plunger 206. Base 204 may be cylindrical with an axial direction A being parallel with the transverse direction T. For instance, base 204 may include blind end 202. Accordingly, plunger 206 may include contact end 200. Plunger 206 may be received within base 204. Thus, plunger 206 may be smaller than base 204. For instance, a diameter of plunger 206 may be smaller than a diameter of base 204 such that plunger 206 translates axially within base 204.

Receiving pin 198 may further include a spring 208. Spring 208 may bias plunger 206 against base 204 (e.g., against blind end 202). As shown in FIG. 10C, spring 208 is accommodated within base 204. As will be explained in more detail below, when water tank 120 is inserted within cabinet 110, plunger 206 of receiving pin 198 is biased against spring 208 to be received within base 204. Although spring 208 is shown as a compression spring, any suitable type of resilient member may be incorporated. For instance, a resilient (e.g., rubber) plug may be inserted within base 204. Additionally or alternatively, an extension spring, a leaf spring, a oil spring, or the like may be incorporated as spring 208.

Base 204 may be operably coupled to a controller (e.g., controller 136). For instance, one or more connections 210 (e.g., bus lines, wires, etc.) may connect receiving pin 198 (e.g., base 204) with controller 136 (e.g., via extension portion 192). Thus, as would be understood, each of the pair of receiving pins 198 may have a dedicated connection 210. As explained above, since receiving pin 198 is a conducting pin, an electrical signal may be transmitted from receiving pin 198 though connection 210 into controller 136. The pair of receiving pins 198 may collectively form a first circuit (e.g., together with controller 136). For instance, when an additional conductive material or item (e.g., additional conductive pins, water, etc.) electrically connects the pair of receiving pins 198 together, the first circuit may be considered closed or completed.

First connector 180 may include a pair of first magnets 212. The pair of first magnets 212 may be spaced apart from each other along the lateral direction L. For instance, according to some embodiments, the pair of first magnets 212 are spaced outside of the pair of receiving pins 198 (e.g., along the lateral direction L). Additionally or alternatively, each of the pair of first magnets 212 may be coplanar with front face 183 of first portion 184 of body 182 (e.g., along the transverse direction T). Each of the pair of first magnets 212 may be identical. As such, hereinafter, a single first magnet 212 will be described in detail with the understanding that the description applies to each first magnet 212.

First magnet 212 may be embedded into first portion 184 of body 182. For instance, as seen in FIG. 10C, a front face of first magnet 212 may be exposed through front face 183 of first portion 184 of body 182. First magnet 212 may be made from a ferrous material capable of generating a magnetic field or attraction. Additionally or alternatively, first magnet 212 may have any suitable shape or size so as to fit within body 182.

Each of the pair of first magnets 212 may be connected (e.g., operably connected, electrically connected) with controller 136. For instance, first connector 180 may include one or more magnet connections 214 (e.g., bus lines, wires, etc.). Thus, as would be understood, each of the pair of first magnets 212 may have a dedicated magnet connection 214. The pair of first magnets 212 may collectively form a second circuit (e.g., together with controller 136). For instance, when an additional conductive material or item (e.g., additional magnets, etc.) electrically connects the pair of first magnets 212 together, the second circuit may be considered closed or completed.

Figure 12:
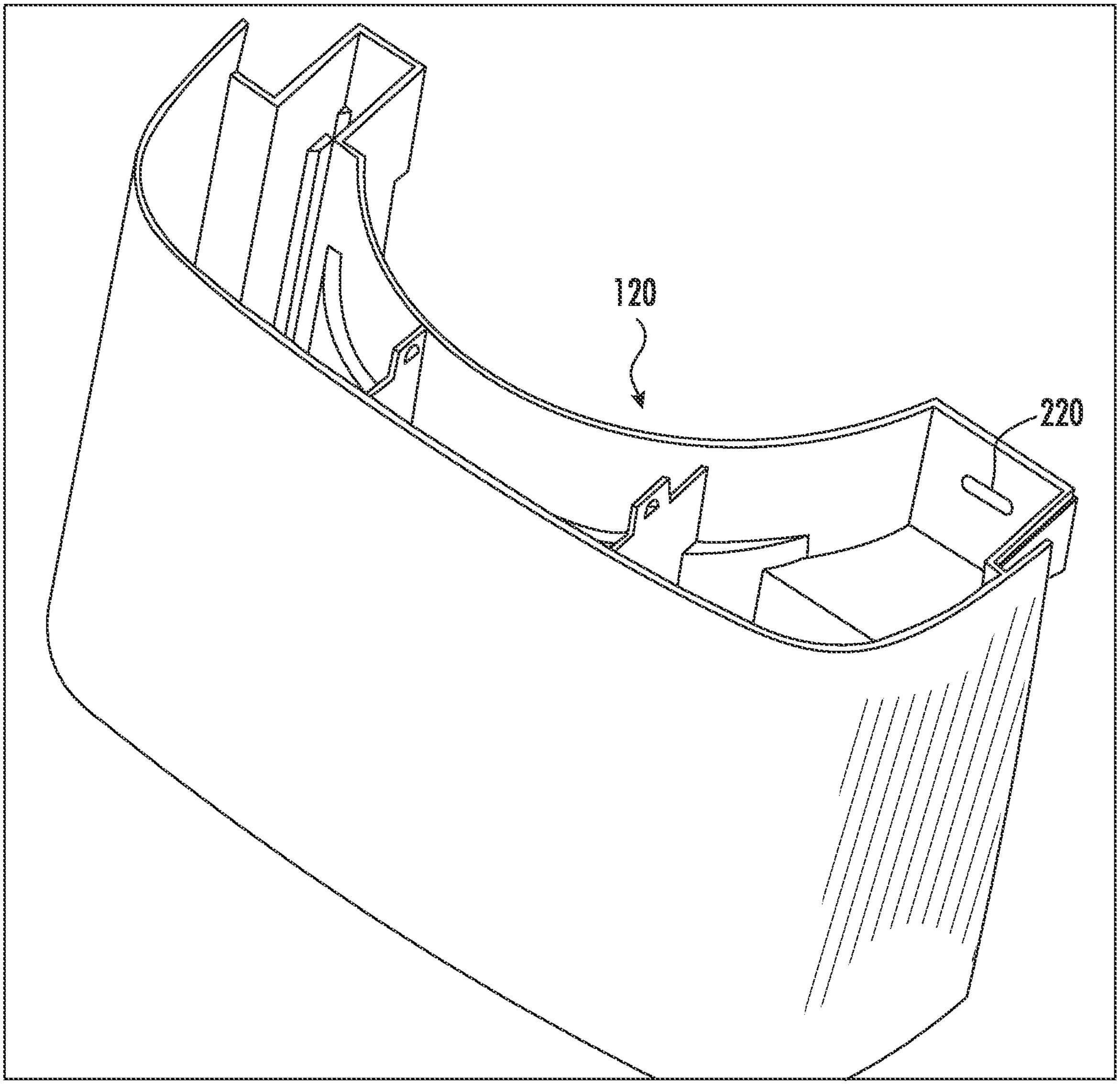
FIG. 12 provides a perspective view of a water tank of the exemplary dehumidifier appliance of FIG. 1.

Referring now to FIG. 12, water tank 120 is shown removed from cabinet 110. Appliance 100 may include a second connector 220. Second connector 220 may be provided within water tank 120. For instance, as shown in FIG. 12, second connector 220 may be embedded within a wall of water tank 120. According to one example, second connector 220 is provided within a rear wall of water tank 120. Second connector 220 may be configured to mate with first connector 180. For instance, when water tank 120 is inserted into cabinet 110 (e.g., within receiving space 111), second connector 220 may interact with first connector 180. As will be described, second connector 220 may be attracted to first connector 180 (e.g., via the pair of first magnets 212).

With reference to FIGS. 12, 13A, 13B, and 13C, second connector 220 may include a body 222. Body 222 may be formed from a non-conducting (e.g., insulating) material, such as a plastic or polymer material. In some instances, body 222 is integrally formed within water tank 120. For example, body 222 may be injection molded into water tank 120. Additionally or alternatively, body 222 may be installed to water tank 120. Accordingly, a seal may be incorporated with body 222 to prevent leaking between water tank 120 and second connector 220. Moreover, second connector 220 may include one or more tabs 224. Tabs 224 may extend from body 222 along the vertical direction V (e.g., toward each of a top and a bottom of water tank 120). Tabs 224 may assist in locating and securing second connector 220 within the wall of water tank 120.

Body 222 may be shaped similarly to body 182 of first connector 180. In particular, body 222 may have similar dimensions to first portion 184 of body 182 of first connector 180. Thus, body 222 may be elongated along the lateral direction L, defining a curved portion at either lateral end. Body 222 may define a thickness along the transverse direction T. For instance, the thickness of body 222 may be approximately equal to a thickness of the wall of water tank 120. Accordingly, a front face 221 of body 222 may be exposed to an interior of water tank 120 while a rear face 223 may be exposed to cabinet 110 (e.g., to rear wall 113) and subsequently exposed to first connector 180.

Second connector 220 may include a pair of contact pins 226. For instance, two contact pins 226 may be provided within body 222. The pair of contact pins 226 may be spaced apart from each other along the lateral direction L. Additionally or alternatively, each of the pair of contact pins 226 may extend through body 222 (e.g., along the transverse direction T). Each of the pair of contact pins 226 may be identical. As such, hereinafter, a single contact pin 226 will be described in detail with the understanding that the description applies to each contact pin 226.

Contact pin 226 may be a conductive member capable of producing an electric current. For instance, contact pin 226 may provide a connection along an electrical circuit (e.g., between a source and a ground). Contact pin 226 may thus be formed from a conductive material. For one example, contact pin 226 is formed from copper. Contact pin 226 may be formed from any conductive material, however, and the disclosure is not limited to the examples given herein.

Contact pin 226 may include a first end 228 and a second end 230 opposite first end 228. In detail, first end 228 may be exposed within water tank 120. As mentioned above, front face 221 of body 222 may be coplanar with an interior face of water tank 120. Accordingly, first end 228 of contact pin 226 may also be coplanar with the interior face of water tank 120. Second end 230 may be exposed toward cabinet 110 (e.g., toward rear wall 113). For instance, second end 230 may be exposed toward contact end 200 (e.g., plunger 206) of receiving pin 198. Thus, when water tank 120 is inserted into cabinet 110, contact end 220 of receiving pin 198 comes into electrical contact with second end 230 of contact pin 226.

Second connector 220 may include a pair of second magnets 232. The pair of second magnets 232 may be spaced apart from each other along the lateral direction L. For instance, according to some embodiments, the pair of second magnets 232 are spaced outside of the pair of contact pins 226 (e.g., along the lateral direction L). Additionally or alternatively, each of the pair of second magnets 232 may be coplanar with rear face 223 of body 222 (e.g., along the transverse direction T). Each of the pair of second magnets 232 may be identical. As such, hereinafter, a single second magnet 232 will be described in detail with the understanding that the description applies to each second magnet 232.

Figure 13A:
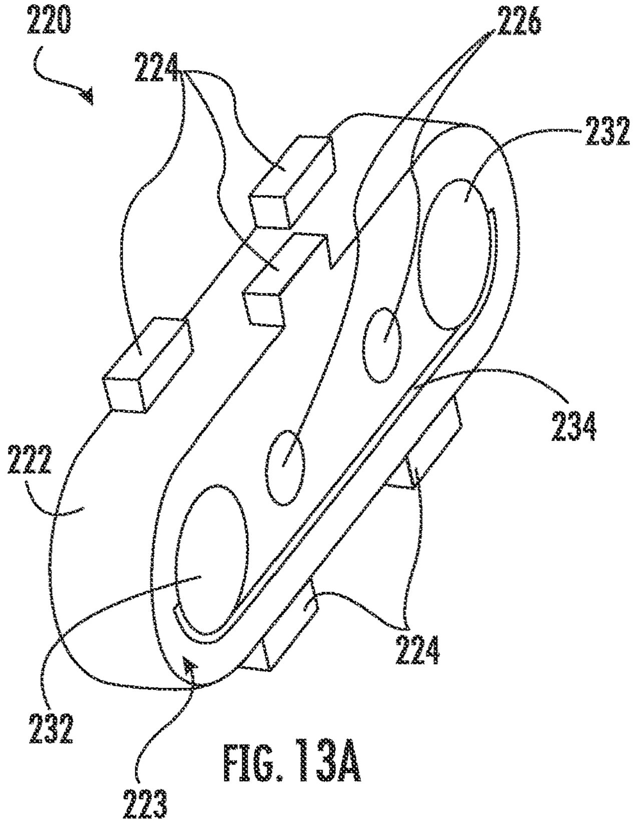
FIGS. 13A, 13B, and 13C provide perspective views of a second connector of the exemplary dehumidifier appliance of FIG. 1.
Figure 13B:
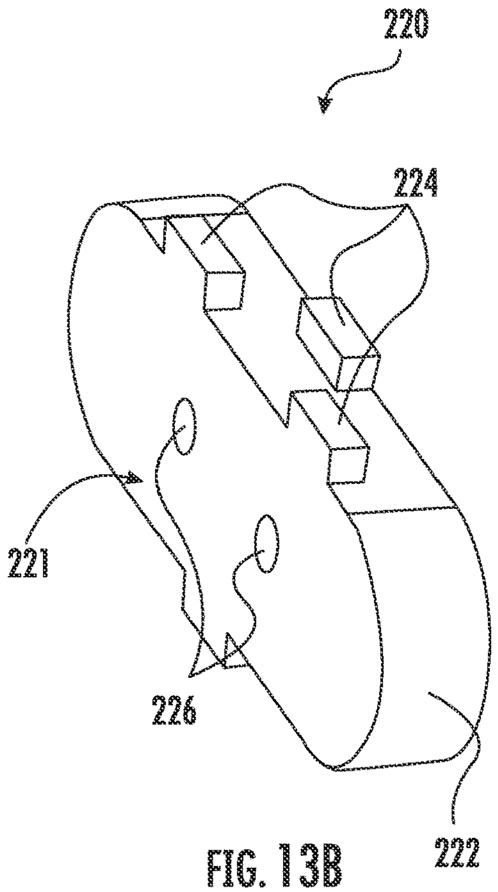
Figure 13C:
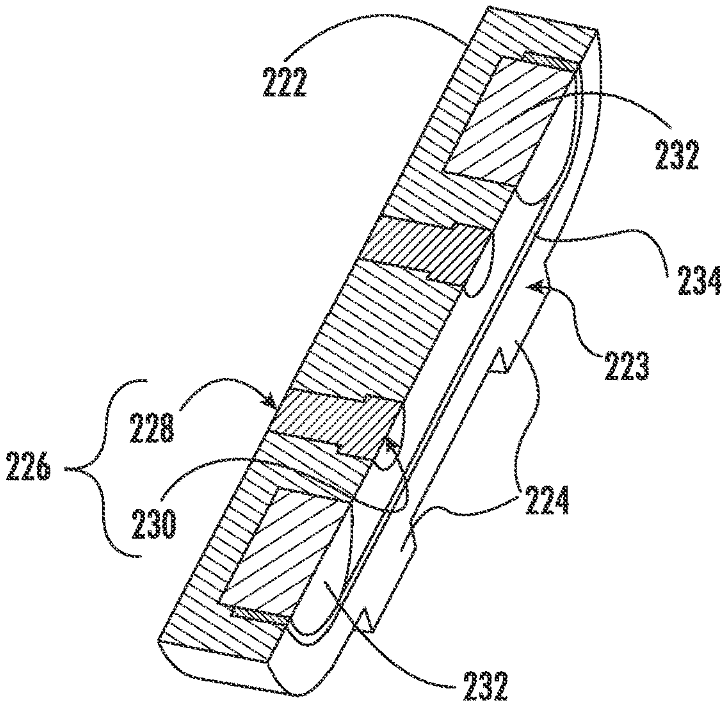

Second magnet 232 may be embedded into body 222. For instance, as seen in FIG. 13C, a rear face of second magnet 232 may be exposed through rear face 223 of body 222. Second magnet 232 may be made from a ferrous material capable of generating a magnetic field or attraction. Additionally or alternatively, second magnet 232 may have any suitable shape or size so as to fit within body 222.

Second connector 220 may include a conducting bridge 234. Conducting bridge 234 may connect the pair of second magnets 232 with each other. For instance, conducting bridge 234 may be an electrically conducting piece in contact with each of the pair of second magnets 232. In some embodiments, conducting bridge 234 is a piece of sheet metal formed to partially surround each of the pair of second magnets 232. Accordingly, an electrical connection is provided between the pair of second magnets 232, e.g., to complete the second circuit.

Figure 14:
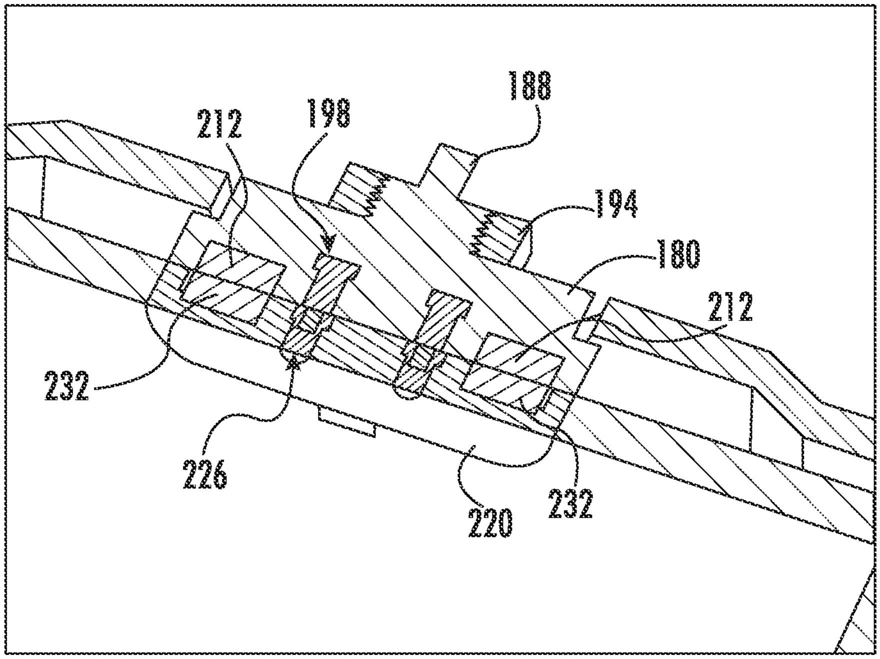
FIG. 14 provides a section view of the first and second connectors in an attached position according to exemplary embodiments of the present disclosure.

Second magnet 232 may be attracted to first magnet 212. In detail, second magnet 232 may selectively mate with first magnet 212 when water tank 120 is inserted into cabinet 110. A positioning of second connector 220 within the wall of water tank 120 may correspond to the positioning of first connector 180 within rear wall 113 of cabinet 110 (e.g., spatially). Thus, referring briefly to FIG. 14, as water tank 120 is inserted, second magnet 232 is aligned with first magnet 212 along the transverse direction T. As water tank 120 is pushed further in, first magnet 212 and second magnet 232 are attracted to each other to couple second connector 220 to first connector 180. Because the pair of second magnets 232 are electrically connected with each other via conducting bridge 234, the second circuit is completed when second magnet 232 is attracted to and electrically connected with first magnet 212.

When first magnet 212 and second magnet 232 are attracted to each other, first connector 180 is aligned with second connector 220. For instance, as mentioned above, first connector 180 is movable with respect to cabinet 110. Accordingly, minor misalignment of first connector 180 with respect to second connector 220 may be corrected (e.g., as first connector 180 shifts with respect to cabinet 110). Further, contact pin 226 is aligned with receiving pin 198 (e.g., along the transverse direction T). As second connector 220 approached first connector 180 along the transverse direction T, receiving pin 198 (e.g., contact end 200 of plunger 206) engages contact pin 226. As mentioned above, plunger 206 is received within base 204 via spring 208. Advantageously, firm contact is maintained between contact pin 226 and receiving pin 198.

As mentioned above, contact pins 226 are electrically conducting and may form closing points for the first circuit. For instance, during the operation of dehumidifier appliance 100, water from the air circulated through the airflow path is removed at evaporator 124 and collected within the water tank 120. The collected water thus rises within water tank until reaching second connector 220. When the water level reaches contact pins 226, a final electrical connection is made for the first circuit (e.g., between the pair of contact pins 226, the pair of receiving pins 198, and controller 136).

Now that the construction of dehumidifier appliance 100 and the configuration of controller 136 according to exemplary embodiments have been presented, an exemplary method 300 of operating a dehumidifier appliance will be described. Although the discussion below refers to the exemplary method 300 of operating dehumidifier appliance 100, one skilled in the art will appreciate that the exemplary method 300 is applicable to the operation of a variety of other dehumidifier or air conditioning appliances. In exemplary embodiments, the various method steps as disclosed herein may be performed by controller 136 or a separate, dedicated controller.

Figure 15:
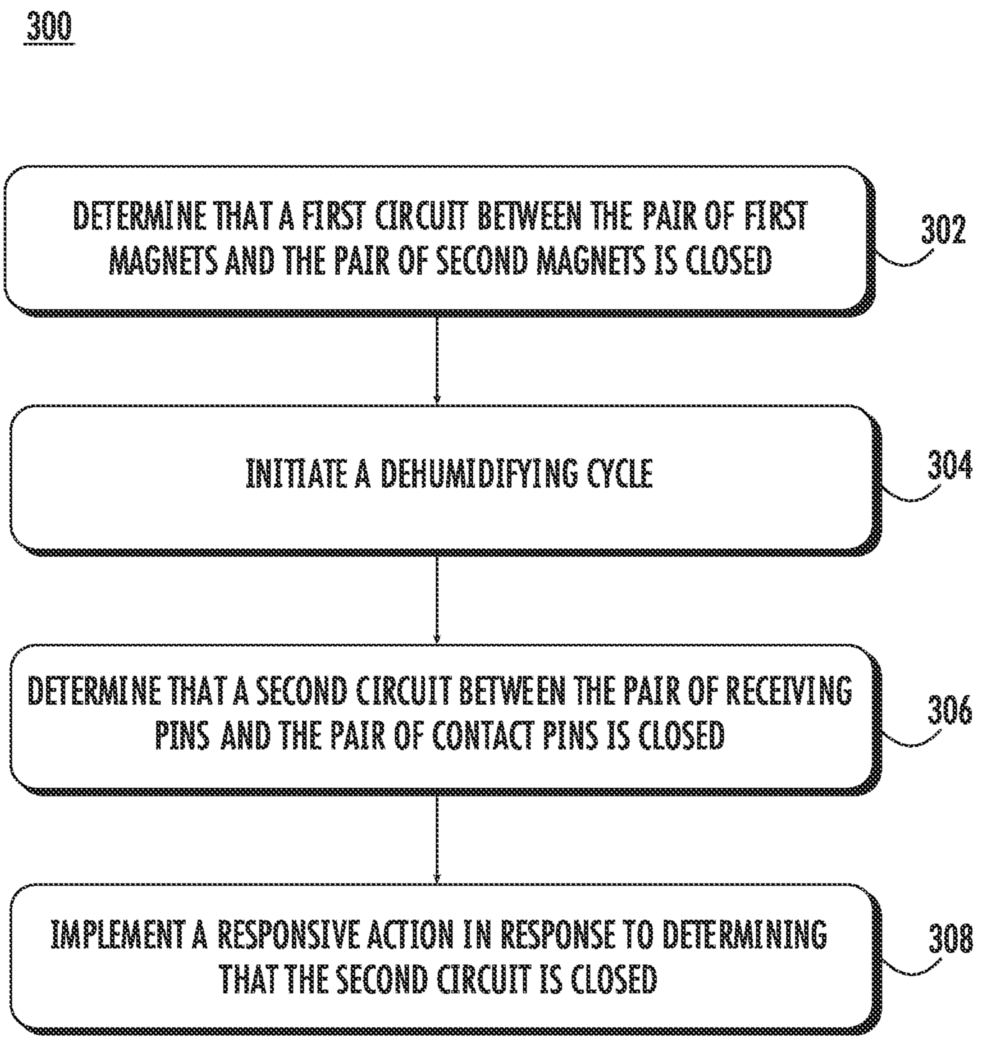
FIG. 15 provides a flow chart illustrating an example of operating a dehumidifier appliance according to exemplary embodiments of the present disclosure.

Referring now to FIG. 15, at step 302, method 300 may include determining that a first circuit between the pair of first magnets and the pair of second magnets is closed. For instance, as described above, a pair of first magnets (e.g., first magnets 212) may be positioned within a connector (e.g., first connector 180) within the dehumidifier appliance. A pair of second magnets (e.g., second magnets 232) may be positioned within a connector (e.g., second connector 220) within a water tank or bucket removably coupled to the dehumidifier appliance. The pair of second magnets may be electrically coupled with each other, while the pair of first magnets may be electrically coupled to the controller. Thus, when the second magnets approach the first magnets and make contact therewith, the first circuit is closed or completed.

At step 304, method 300 may include initiating a dehumidifying cycle. In response to the first circuit being completed, the method may activate a refrigeration assembly (e.g., refrigeration loop 130) including an evaporator and an air handler to circulate air via the air handler over the evaporator. For instance, the air handler may be directed at a predetermined speed. The predetermined speed may be a constant speed dictated by a requested moisture or humidity level for the air. Further, the refrigeration assembly may be energized to drive a refrigerant through the refrigeration loop. Moisture within the air may be removed after passing over the evaporator and collected within the water tank.

At step 306, method 300 may include determining that a second circuit between a pair of receiving pins and a pair of contact pins is closed. As mentioned above the first connector may include the pair of receiving pins (e.g., receiving pins 198) while the second connector includes the pair of contact pins (e.g., contact pins 226). As the second connector is attached to the first connector, the second circuit is formed between the contact pins and the receiving pins. Further, as mentioned above, the water collected within the water tank may rise to contact second connector (e.g., at the contact pins). When the water level contacts each of the pair of contact pins, the second circuit may be completed.

At step 308, method 300 may include implementing a responsive action in response to determining that the second circuit is closed. In detail, the second circuit may be an indication that the water tank or bucket is sufficiently full of water, or moisture collected from the airflow. Accordingly, the responsive action may include ceasing an operation of (or de-energizing) the refrigeration assembly. For instance, a compressor of the refrigeration assembly may be switched off or otherwise deactivated. Additionally or alternatively, an operation of the air handler may be terminated. Accordingly, no further water is added to the water tank and no further air is circulated through the appliance.

Moreover, the responsive action may include emitting or otherwise issuing a notification to a user as to the status of the appliance. For instance, method 300 may activate a notification on the appliance (e.g., via display 144 or control panel 140). The notification may include a visual notification, such as a light, a display, etc. The notification may further include an audible notification, such as a tone, a buzzer, an alert, or the like. Additionally or alternatively, the notification may include a remote notification. For instance, as described above, the dehumidifier appliance may be connected to one or more remote user devices via a network connection. The responsive action may include emitting or pushing a remote notification to the remote user device or devices. The remote notification may include a visual and/or an audible notification delivered via the remote user device. In some embodiments, the remote notification is issued via a mobile application (app). Thus, the user is notified that the dehumidification cycle is complete and the water tank may be emptied to initiate a subsequent dehumidification cycle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dehumidifier appliance defining a vertical direction, a lateral direction, and a transverse direction, the dehumidifier appliance comprising:
- a cabinet defining an airflow path that extends between an air inlet and an air outlet spaced apart from the air inlet;
- a water tank removably mounted within the cabinet below the airflow path;
- a first connector provided within the cabinet, the first connector comprising a pair of receiving pins and a pair of first magnets;
- a second connector provided within the water tank and configured to mate with the first connector, the second connector comprising a pair of contact pins and a pair of second magnets; and
- a controller in operative communication with the first connector, the controller configured to perform an operation, the operation comprising:
  - determining that a first circuit between the pair of first magnets and the pair of second magnets is closed;
  - initiating a dehumidifying cycle;
  - determining that a second circuit between the pair of receiving pins and the pair of contact pins is closed; and
  - implementing a responsive action in response to determining that the second circuit is closed.

2. The dehumidifier appliance of claim 1, wherein the cabinet comprises a rear wall, and wherein the first connector is attached to the rear wall.

3. The dehumidifier appliance of claim 2, wherein the first connector comprises:
- a body, wherein the pair of receiving pins and the pair of first magnets are received within the body; and
- a fastener selectively coupling the body to the rear wall.

4. The dehumidifier appliance of claim 1, wherein each of the pair of receiving pins is spring loaded within the first connector along the transverse direction.

5. The dehumidifier appliance of claim 1, wherein each of the pair of contact pins comprises:
- a first end exposed within the water tank; and
- a second end opposite the first end exposed toward the cabinet, wherein the second end of each of the pair of contact pins is configured to selectively mate with the pair of receiving pins.

6. The dehumidifier appliance of claim 1, wherein the pair of first magnets selectively attracts the pair of second magnets when the water tank is inserted into the cabinet.

7. The dehumidifier appliance of claim 1, further comprising:
- an air handler operably coupled to the airflow path for selectively urging a flow of air therethrough; and
- a refrigeration assembly mounted within the cabinet along the airflow path for selectively dehumidifying the flow of air.

8. The dehumidifier appliance of claim 7, wherein initiating the dehumidifying cycle comprises:
- directing the air handler at a predetermined speed; and
- energizing the refrigeration assembly to circulate a refrigerant.

9. The dehumidifier appliance of claim 8, wherein the responsive action comprises:
- terminating the air handler; and
- de-energizing the refrigeration assembly.

10. A method of operating a dehumidifier appliance, the dehumidifier appliance comprising a first connector comprising a pair of first magnets and a pair of receiving pins and a second connector comprising a pair of second magnets and a pair of contact pins, the method comprising:
- determining that a first circuit between the pair of first magnets and the pair of second magnets is closed;
- initiating a dehumidifying cycle;
- determining that a second circuit between the pair of receiving pins and the pair of contact pins is closed; and
- implementing a responsive action in response to determining that the second circuit is closed.

11. The method of claim 10, wherein the dehumidifier appliance further comprises:
- a cabinet comprising a rear wall; and
- a water tank removably mounted within the cabinet, and wherein the first connector is attached to the rear wall adjacent the water tank.

12. The method of claim 11, wherein the first connector comprises:
- a body, wherein the pair of receiving pins and the pair of first magnets are received within the body; and
- a fastener selectively coupling the body to the rear wall.

13. The method of claim 11, wherein each of the pair of receiving pins is spring loaded within the first connector along a transverse direction.

14. The method of claim 11, wherein each of the pair of contact pins comprises:
- a first end exposed within the water tank; and
- a second end opposite the first end exposed toward the cabinet, wherein the second end of each of the pair of contact pins is configured to selectively mate with the pair of receiving pins.

15. The method of claim 11, wherein the pair of first magnets selectively attracts the pair of second magnets when the water tank is inserted into the cabinet.

16. The method of claim 11, wherein the dehumidifier appliance further comprises:
- an airflow path formed within the cabinet;
- an air handler operably coupled to the airflow path for selectively urging a flow of air therethrough; and
- a refrigeration assembly mounted within the cabinet along the airflow path for selectively dehumidifying the flow of air.

17. The method of claim 16, wherein initiating the dehumidifying cycle comprises:
- directing the air handler at a predetermined speed; and
- energizing the refrigeration assembly to circulate a refrigerant.

18. The method of claim 17, wherein the responsive action comprises:
- terminating the air handler; and
- de-energizing the refrigeration assembly.

* * * * *